United States Patent [19]

Matteucci et al.

[11] Patent Number: 5,007,367
[45] Date of Patent: Apr. 16, 1991

[54] INFLATABLE BALLOON DISTRESS SIGNAL DEVICE

[76] Inventors: Lawrence A. Matteucci, 777 Meadowsweet Dr. #108; Shirley J. Rager, 223 Baltimore Ave., both of Corte Madera, Calif. 94925; Ambrose P. Maher, 381 Lynbrook Dr., Pacifica, Calif. 94044

[21] Appl. No.: 283,167

[22] Filed: Dec. 12, 1988

[51] Int. Cl.⁵ .................. A63H 27/10; B64B 1/50; B65H 49/18
[52] U.S. Cl. .................. 116/210; 116/DIG. 9; 242/137; 242/146; 244/33; 244/155 R
[58] Field of Search .......... 116/210, DIG. 8, DIG. 9; 40/214; 242/96, 137, 137.1, 138, 146; 244/33, 155 R, 155 A; 446/186, 220, 225, 30, 31

[56] References Cited

U.S. PATENT DOCUMENTS

| | | | |
|---|---|---|---|
| 1,296,687 | 3/1919 | Nichols | 244/33 |
| 2,395,006 | 2/1946 | Leslie | 244/33 |
| 2,519,594 | 8/1950 | Ohland | 244/155 A |
| 2,629,115 | 2/1953 | Hansen | 116/210 |
| 3,002,490 | 10/1961 | Murray | 116/210 |
| 4,026,504 | 5/1977 | Christoffel, Jr. | 244/155 A |
| 4,120,259 | 10/1978 | Wilson | 116/210 |

Primary Examiner—William A. Cuchlinski, Jr.
Assistant Examiner—W. Morris Worth

[57] ABSTRACT

A helium balloon is attached to, and in communication with a helium bottle and has attached thereto four guide lines so that selected lines can be pulled as needed to guide the balloon through clearings in overhead foliage. When not in use the lines are wound on a spindle to be packed with the deflated balloon. The spindle carries an arrowhead to be extended from one end thereof and driven into the ground to anchor the guide lines.

3 Claims, 2 Drawing Sheets

INFLATABLE BALLOON DISTRESS SIGNAL DEVICE

BACKGROUND OF THE INVENTION

This invention relates to an inflatable ballon distress signal device and, more particularly, to an inflatable ballon with means to manipulate it so that it can be guided around the limbs of trees or other overhead obstacles, which might otherwise prevent its full ascent.

Inflatable ballon distress signals are shown in Wilson U.S. Pat. No. 4,120,259, Patel U.S. Pat. No. 4,219,819, Davis U.S. Pat. No. 4,094,267 and McNeill U.S. Pat. No. 3,941,079. However, these patents merely show a balloon on the end of a tethering line, which obviously will rise in the direction of the prevailing wind with no means for manipulating the ascent of the balloon to enable it to rise above overhanging vegetation and trees.

OBJECTS OF THE INVENTION

It is an object of this invention to provide an emergency distress signal balloon the ascent of which can be controlled to the extent necessary to avoid overhanging impediments.

It is a further object of this invention to provide a distress signal ballon device having a self-contained anchor means for securing lines to the ground.

It is a further object of this invention to provide a distress signal balloon having self-contained stabilizing means.

Other objects and advantages of this invention will become apparent from the description to follow, particularly when read in conjunction with the accompanying drawing full.

SUMMARY OF THE INVENTION

In carrying out this invention, we provide a distress signal balloon, which is bright in color to enhance detection. The balloon is received in a somewhat larger than hemispherical net which encases the balloon from its top down to a level below the "equator" of the balloon. Guide lines are secured to the net at 90° intervals aound the balloon. Hence, as the balloon rises, selected lines may be restrained or pulled to guide the ballon through openings between trees as necessary. Before use, the guide lines are wound around four spools on a spindle and the deflated balloon, with guide lines attached to a base member, is folded along the spindle, together with a lighter-than-air gas bottle. Suitable valve means are operated to release the contents of the gas bottle into the balloon, causing the balloon to rise so that the lines are unreeled from the spindle. The gas bottle, being attached to the balloon, functions as ballast to stabilize the balloon in flight.

DESCRIPTION OF A PREFERRED EMBODIMENT

Figure 1:
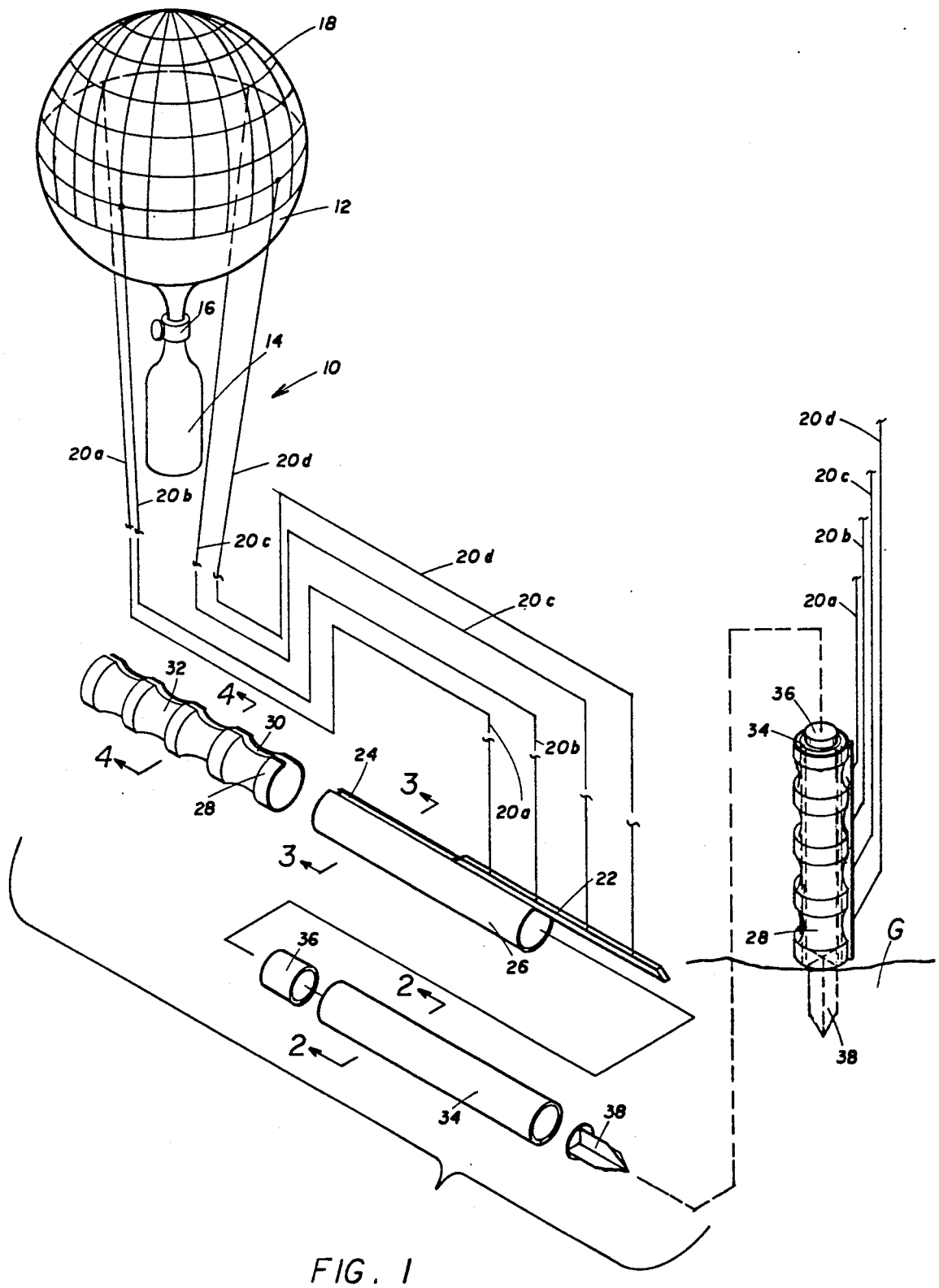
FIG. 1 is an exploded view in perspective showing the components of the distress signal device of this invention.
Figure 2:
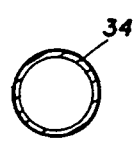
FIG. 2 is a section view taken along line 2—2 of FIG. 1.
Figure 2A:
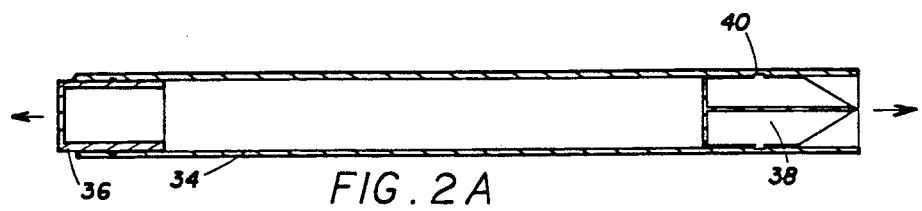
FIG. 2A is a cross-section view of the anchor member shown in FIG. 2.
Figure 3:
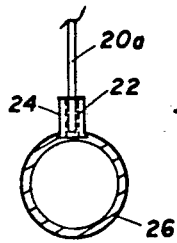
FIG. 3 is a section view taken along line 3—3 of FIG. 1.
Figure 3A:
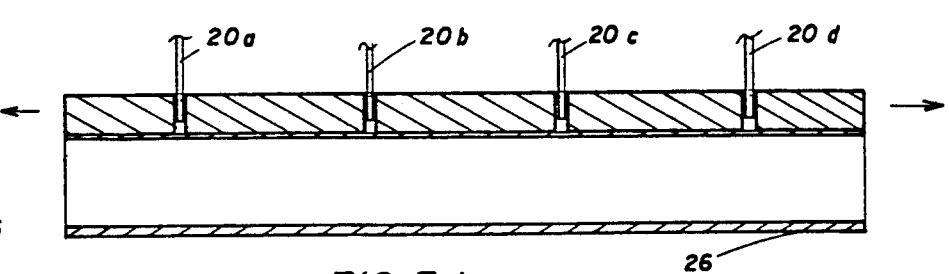
FIG. 3A is a longitudinal section view of the base member of FIG. 3.
Figure 4:
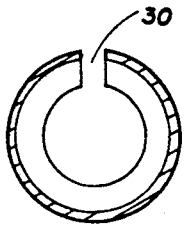
FIG. 4 is a section view taken along line 4—4 of FIG. 1.
Figure 4A:
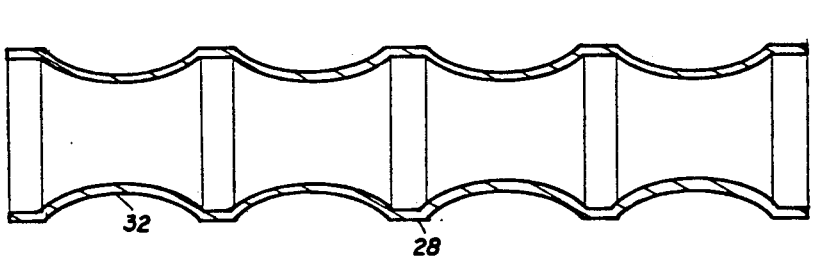
FIG. 4A is a longitudinal section view of the spindle of FIG. 4.

Referring now to FIG. 1 with greater particularity, the inflatable balloon distress signal device 10 of this invention includes a normally deflated balloon 12 attached to, and in communication with, a bottle 14 of lighter-than-air gas, such as helium. Suitable valve means 16 allows the contents of the bottle 14 to be discharged into the balloon 12 to inflate it as needed.

The balloon 12 is secured within a net 18, which is of somewhat larger than hemispherical shape so as to firmly capture the balloon 12 when it is inflated. That is, the net 18 extends from the "north pole" to below the "equator" of the spherical balloon 12 to grasp it firmly.

Extending from the net 18 are, preferably four, guide lines 20a, 20b, 20c and 20d, which are secured to the net 12 at 90° intervals around the balloon. The other ends of the guide lines 20a, 20b, 20c and 20d are secured to a dovetail base bar 22, which in use, is slidably received in a dove tail groove 24 in a tubular base member 26. In commercializing this invention, the balloon 12, with helium bottle 14, securing net 18, guide lines 20a-20d as well as the dovetail base bar 22 may be sold as a unit to install on a base member 26, which is then received within a spindle 28 so that the guide lines extend out through a slot 30 formed between the edges of the split spindle. The guide lines may then be wound onto the spindle 28 on each of four spools 32 with the balloon 12 folded to lay over the helium bottle 14 and spindle 28. Carried within the base member 26 is a tubular anchor 34 carrying a cylindrical anvil at one end and a cruciform arrow 38 at the other. The cruciform arrow 38 may be extended from the end of the tube 34 secured in position by any suitable holding means, such as spring detents 40 or the like engaging in an annular groove, and driven into the ground G by pounding on the plunger 36. When the plunger 36 and the arrow stake 38 are extended by repositioning the holding means, they may serve as handles to hold as the guide lines 20a-20d unwind from the spindle 28. Particularly when the spindle 28 is held vertically, as shown, the lines 20a-d converge from the balloon 12 so that a pull on a selected line will produce a horizontal force vector to enable one to "steer" the balloon.

In use, an injured or lost hiker, hunter or the like can open the valve 16 to inflate the balloon 12 and, as it starts to rise, grasp the lines 20a, 20b, 20c and 20d to "steer" the balloon as may be necessary to guide it through openings in foliage overhead. The user may use the arrowhead 38 and plunger 36 as handles to allow the cords 20a-20d to unwind freely from the spools 32. In practice, the cords may be 100 feet or more in length so that the balloon 12, being of a bright color such as orange or red, will provide a visible signal for great distances. While inflated, the balloon is stabilized by the weight of the helium bottle 12 to minimize fluttering and bobbing in the wind.

While this invention has been described in conjunction with a preferred embodiment thereof, it is obvious that modifications and changes therein may be made by those skilled in the art to which it pertains, without departing from the spirit and scope of this invention as defined by the claims appended hereto.

What is claimed as invention is:

1. A distress signal device comprising:
   a generally spherical balloon;
   a net containing said balloon;
   said net having a bottom opening smaller in diameter than the maximum horizontal diameter of said balloon;
   a base member;
   four guide lines extending between and converging continuously from said net at 90° intervals around said balloon to said base member;
   a spindle carrying said base member having four spools to wind said guide lines thereon; means for inflating said balloon with lighter-than-air gas; and means for anchoring said base member to the ground.

2. The distress signal device defined by claim 1 wherein said anchoring means includes:
   a sharp stake at one end of said base member to penetrate the surface of the ground; and
   an anvil member at the other end of said base member to drive said stake member.

3. The distress signal device defined by claim 2 wherein:
   said base member is tubular; and
   said sharp stake and anvil member are slidable in said base member from a retracted position therein to an extended position protruding therefrom.

* * * * *